US012568251B2

(12) United States Patent
Kang et al.

(10) Patent No.: US 12,568,251 B2
(45) Date of Patent: Mar. 3, 2026

(54) METHOD AND APPARATUS FOR VIDEO CODING USING SUPER-RESOLUTION IN-LOOP FILTER

(71) Applicants: HYUNDAI MOTOR COMPANY, Seoul (KR); KIA CORPORATION, Seoul (KR); EWHA UNIVERSITY—INDUSTRY COLLABORATION FOUNDATION, Seoul (KR)

(72) Inventors: Je Won Kang, Seoul (KR); Jung Kyung Lee, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); EWHA UNIVERSITY—INDUSTRY COLLABORATION FOUNDATION, Seoul (KR)

( * ) Notice: Subject to any disclaimer, the term of this patent is extended or adjusted under 35 U.S.C. 154(b) by 0 days.

(21) Appl. No.: 18/816,408

(22) Filed: Aug. 27, 2024

(65) Prior Publication Data

US 2024/0422360 A1      Dec. 19, 2024

Related U.S. Application Data

(63) Continuation of application No. PCT/KR2023/002247, filed on Feb. 16, 2023.

(30) Foreign Application Priority Data

Mar. 14, 2022    (KR) ........................ 10-2022-0031336
Feb. 10, 2023    (KR) ........................ 10-2023-0018329

(51) Int. Cl.
H04N 19/82        (2014.01)
H04N 19/105       (2014.01)
(Continued)

(52) U.S. Cl.
CPC ........... H04N 19/82 (2014.11); H04N 19/105 (2014.11); H04N 19/109 (2014.11);
(Continued)

(58) Field of Classification Search
CPC .. H04N 19/105; H04N 19/109; H04N 19/117; H04N 19/132; H04N 19/147;
(Continued)

(56) References Cited

U.S. PATENT DOCUMENTS 12,041,248 B2 *   7/2024   Chubach .............. H04N 19/132
2020/0162789 A1 *  5/2020   Ma ................. H04N 21/440263
(Continued)

FOREIGN PATENT DOCUMENTS

KR        10-2022375 B1      9/2019
WO        2021/228513 A1    11/2021

*Primary Examiner* — Boubacar Abdou Tchoussou
(74) *Attorney, Agent, or Firm* — MCDONNELL BOEHNEN HULBERT & BERGHOFF LLP

(57) ABSTRACT

A method and an apparatus for video coding using a super-resolution in-loop filter utilize an in-loop filter based on upsampling or super-resolution techniques in processing a video signal through downsampling to the compression and upsampling to the reconstruction thereof. The video decoding method includes obtaining the reconstructed frame, obtaining a scale value representing a resolution difference between the reconstructed frame and the original frame, generating, based on the scale value, an upsampled reconstructed frame by inputting the reconstructed frame into a resampling in-loop filter that is deep learning-based, and storing an output frame as a reference frame once generated (Continued)

by the plurality of filters and the resampling in-loop filter in a decoded picture buffer (DPB).

12 Claims, 20 Drawing Sheets

(51) Int. Cl.

| | |
|---|---|
| *H04N 19/109* | (2014.01) |
| *H04N 19/117* | (2014.01) |
| *H04N 19/132* | (2014.01) |
| *H04N 19/147* | (2014.01) |
| *H04N 19/176* | (2014.01) |
| *H04N 19/30* | (2014.01) |
| *H04N 19/42* | (2014.01) |
| *H04N 19/503* | (2014.01) |

(52) U.S. Cl.
CPC ......... *H04N 19/117* (2014.11); *H04N 19/132* (2014.11); *H04N 19/147* (2014.11); *H04N 19/176* (2014.11); *H04N 19/30* (2014.11); *H04N 19/42* (2014.11); *H04N 19/503* (2014.11)

(58) Field of Classification Search
CPC .... H04N 19/172; H04N 19/176; H04N 19/30; H04N 19/42; H04N 19/423; H04N 19/503; H04N 19/59; H04N 19/70; H04N 19/82; H04N 19/86; G06N 3/045; G06N 3/0464; G06T 9/00
See application file for complete search history.

(56) References Cited

U.S. PATENT DOCUMENTS

| | | | |
|---|---|---|---|
| 2021/0021839 A1 | 1/2021 | Auyeung et al. | |
| 2022/0014752 A1 | 1/2022 | Deng et al. | |
| 2022/0078434 A1 | 3/2022 | Salehifar et al. | |
| 2022/0360802 A1* | 11/2022 | Kalva | H04N 19/112 |
| 2024/0137513 A1* | 4/2024 | Lin | H04N 19/184 |
| 2024/0137517 A1* | 4/2024 | Lin | G06T 3/4046 |
| 2024/0137518 A1* | 4/2024 | Lin | H04N 19/186 |
| 2024/0137519 A1* | 4/2024 | Lin | H04N 19/186 |
| 2024/0236322 A9* | 7/2024 | Lin | H04N 19/192 |
| 2024/0236325 A9* | 7/2024 | Lin | H04N 19/59 |
| 2024/0314308 A1* | 9/2024 | Suzuki | H04N 19/136 |
| 2024/0333953 A1* | 10/2024 | Choi | H04N 19/132 |
| 2025/0008162 A1* | 1/2025 | Takada | H04N 19/186 |
| 2025/0240429 A1* | 7/2025 | Jung | G06T 3/4046 |

\* cited by examiner

Deconvolution Layer n – Number Of Input Channels        1 – Number Of Output Channels Feature Map        Kernels/Filters        Output Video Pooling Layer $$y_1 = \max(x_1, x_2, x_3, x_4)$$
$$y_1 = \operatorname{avg}(x_1, x_2, x_3, x_4)$$

3×3 Kernel,
Stride 2 And Pad 1

Average Pooling           Average Unpooling

Input          Feature Maps

Convolution Layer Kernel: $K_1 \times K_1$     Upsampling Layer Kernel: $K_2 \times K_2$

METHOD AND APPARATUS FOR VIDEO CODING USING SUPER-RESOLUTION IN-LOOP FILTER

CROSS REFERENCE TO RELATED APPLICATIONS

This application is a continuation of International Application No. PCT/KR2023/002247 filed on Feb. 16, 2023, which claims priority to and the benefit of Korean Patent Application No. 10-2022-0031336 filed on Mar. 14, 2022, and Korean Patent Application No. 10-2023-0018329, filed on Feb. 10, 2023, the entire contents of each of which are incorporated herein by reference.

TECHNICAL FIELD

The present disclosure relates to a video coding method and an apparatus using a super-resolution in-loop filter.

BACKGROUND

The statements in this section merely provide background information related to the present disclosure and do not necessarily constitute prior art.

Since video data has a large amount of data compared to audio or still image data, the video data requires a lot of hardware resources, including a memory, to store or transmit the video data without processing for compression.

Accordingly, an encoder is generally used to compress and store or transmit video data. A decoder receives the compressed video data, decompresses the received compressed video data, and plays the decompressed video data. Video compression techniques include H.264/Advanced Video Coding (AVC), High Efficiency Video Coding (HEVC), and Versatile Video Coding (VVC), which has improved coding efficiency by about 30% or more compared to HEVC.

However, since the image size, resolution, and frame rate gradually increase, the amount of data to be encoded also increases. Accordingly, a new compression technique providing higher coding efficiency and an improved image enhancement effect than existing compression techniques is required. Recently, up-sampling or super-resolution techniques have been utilized to improve the quality of video frames. Especially in in-loop filtering, efficient utilization of such techniques for up-sampling or super-resolution enhancement needs to be considered to increase video coding efficiency and enhance video quality.

SUMMARY

The present disclosure seeks to provide a video coding method and an apparatus that utilize an in-loop filter based on upsampling or super-resolution techniques to increase video coding efficiency and enhance video quality in processing a video signal through downsampling to the compression and upsampling to the reconstruction thereof.

At least one aspect of the present disclosure provides a method performed by a video decoding device for upsampling a reconstructed frame. The method includes obtaining the reconstructed frame. The reconstructed frame is a frame that has reconstructed an original frame in advance according to an inter prediction by the video decoding device. The method also includes obtaining a scale value representing a resolution difference between the reconstructed frame and the original frame. The method also includes generating, based on the scale value, an upsampled reconstructed frame by inputting the reconstructed frame into a resampling in-loop filter that is deep learning-based. The resampling in-loop filter replaces one of filters including a deblocking filter, a sample adaptive offset (SAO) filter, and an adaptive loop filter, or is interposed between the filters. The method also includes storing an output frame as a reference frame once generated by the filters and the resampling in-loop filter in a decoded picture buffer (DPB).

Another aspect of the present disclosure provides a method performed by a video encoding device for upsampling a reconstructed frame. The method includes obtaining a scale value representing a resolution difference between an original frame and the reconstructed frame. The reconstructed frame is a frame that has reconstructed the original frame in advance according to an inter prediction by the video encoding device. The method includes obtaining the reconstructed frame. When a resolution of the reconstructed frame based on the scale value is less than a resolution of the original frame, the method further includes generating an upsampled reconstructed frame by inputting the reconstructed frame into a resampling in-loop filter that is deep learning-based. The resampling in-loop filter replaces one of filters including a deblocking filter, a sample adaptive offset (SAO) filter, and an adaptive loop filter, or is interposed between the filters. The method further includes storing an output frame as a reference frame once generated by the filters and the resampling in-loop filter in a decoded picture buffer (DPB).

Yet another aspect of the present disclosure provides a computer-readable recording medium storing a bitstream generated by a video encoding method. The video encoding method includes obtaining a scale value representing a resolution difference between an original frame and a reconstructed frame. The reconstructed frame is a frame that has reconstructed the original frame in advance according to an inter prediction by the video encoding method. The video encoding method also includes obtaining the reconstructed frame. When a resolution of the reconstructed frame based on the scale value is less than a resolution of the original frame, the video encoding method further includes generating an upsampled reconstructed frame by inputting the reconstructed frame into a resampling in-loop filter that is deep learning-based. The resampling in-loop filter replaces one of filters including a deblocking filter, a sample adaptive offset (SAO) filter, and an adaptive loop filter, or is interposed between the filters. The video encoding method further includes storing an output frame as a reference frame once generated by the filters and the resampling in-loop filter in a decoded picture buffer (DPB).

As described above, the present disclosure provides a video coding method and an apparatus that utilize an in-loop filter based on upsampling or super-resolution techniques in processing a video signal through downsampling to the compression and upsampling to the reconstruction thereof. Thus, the video coding method and the apparatus improve video quality and increase video coding efficiency.

DETAILED DESCRIPTION

Figure 1:
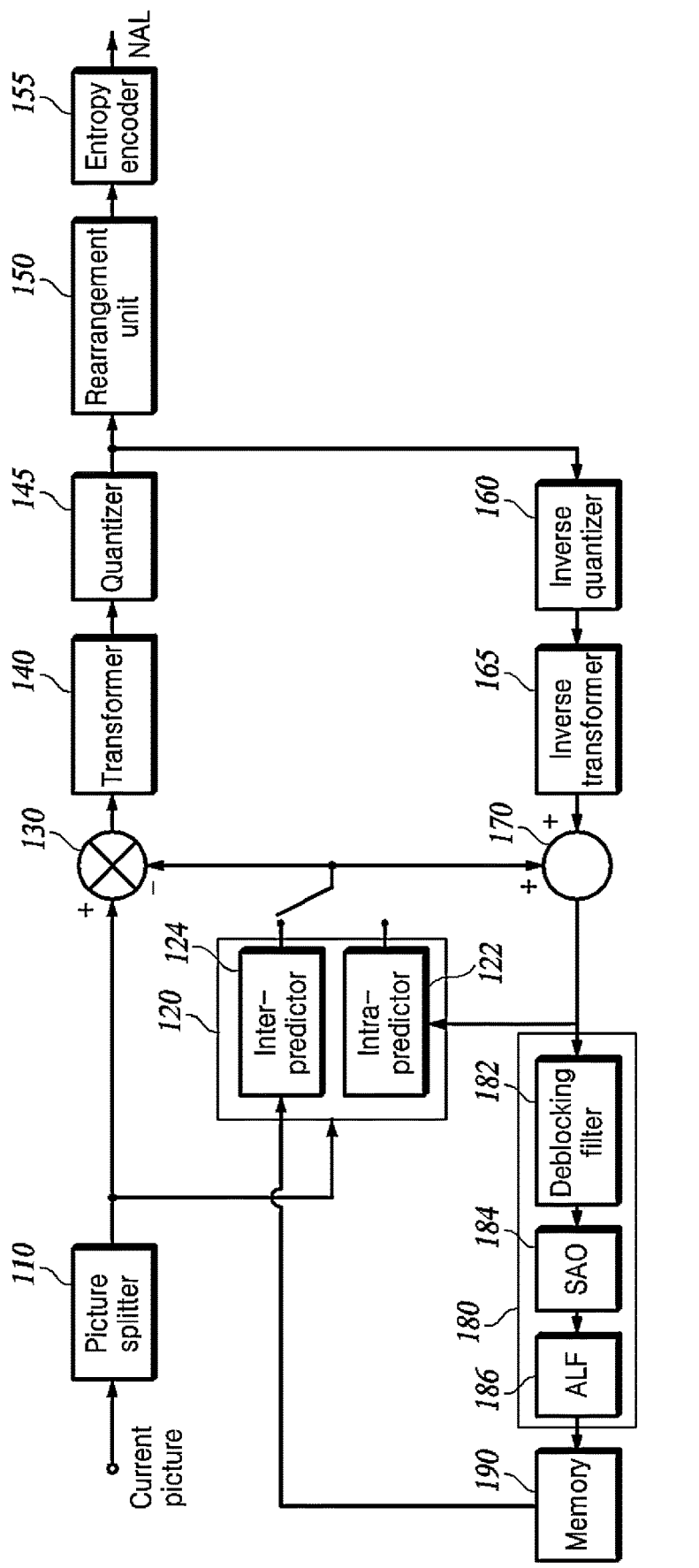
FIG. 1 is a block diagram of a video encoding apparatus that may implement the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

FIG. 1 is a block diagram of a video encoding apparatus that may implement technologies of the present disclosure. Hereinafter, referring to illustration of FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. Here, one or more tiles may be defined as a tile group. Each tile or/and slice is split into one or more coding tree units (CTUs). In addition, each CTU is split into one or more coding units (CUs) by a tree structure. Information applied to each coding unit (CU) is encoded as a syntax of the CU, and information commonly applied to the CUS included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size) is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. Here, a binarytree ternarytree (BTTT) is added to the tree structures to be referred to as a multiple-type tree (MTT).

Figure 2:
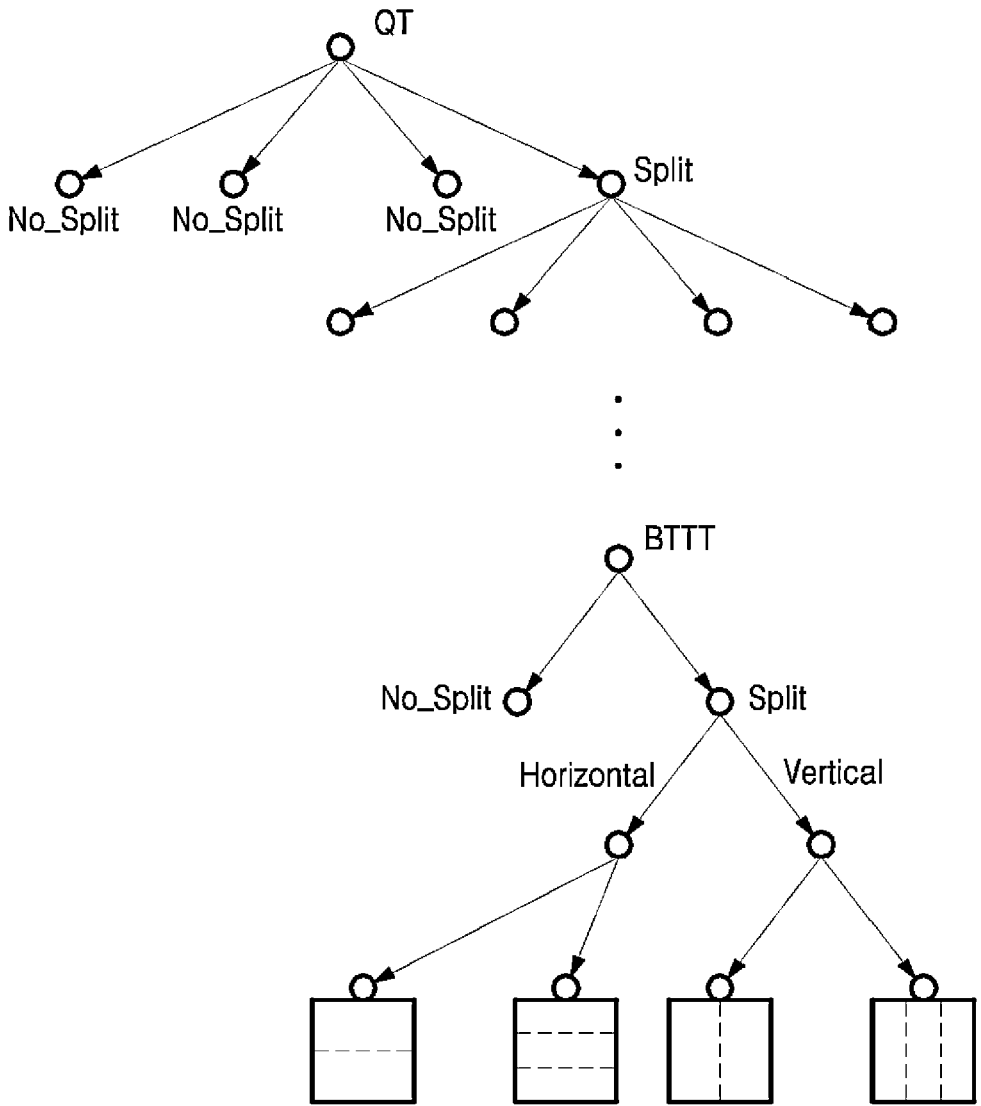
FIG. 2 illustrates a method for partitioning a block using a quadtree plus binarytree ternarytree (QTBTTT) structure.

FIG. 2 is a diagram for describing a method for splitting a block by using a QTBTTT structure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split-_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. Meanwhile, a type in which the block of the corresponding node is split into two blocks asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
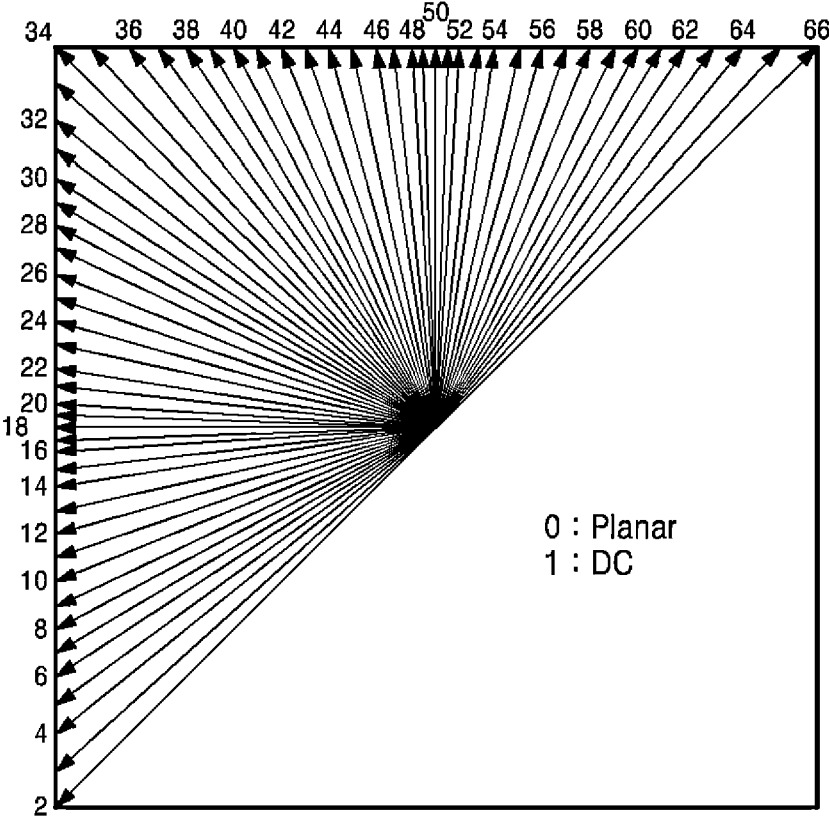
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a DC mode and may include 65 directional modes. A neighboring pixel and an arithmetic equation to be used are defined differently according to each prediction mode.

Figure 3B:
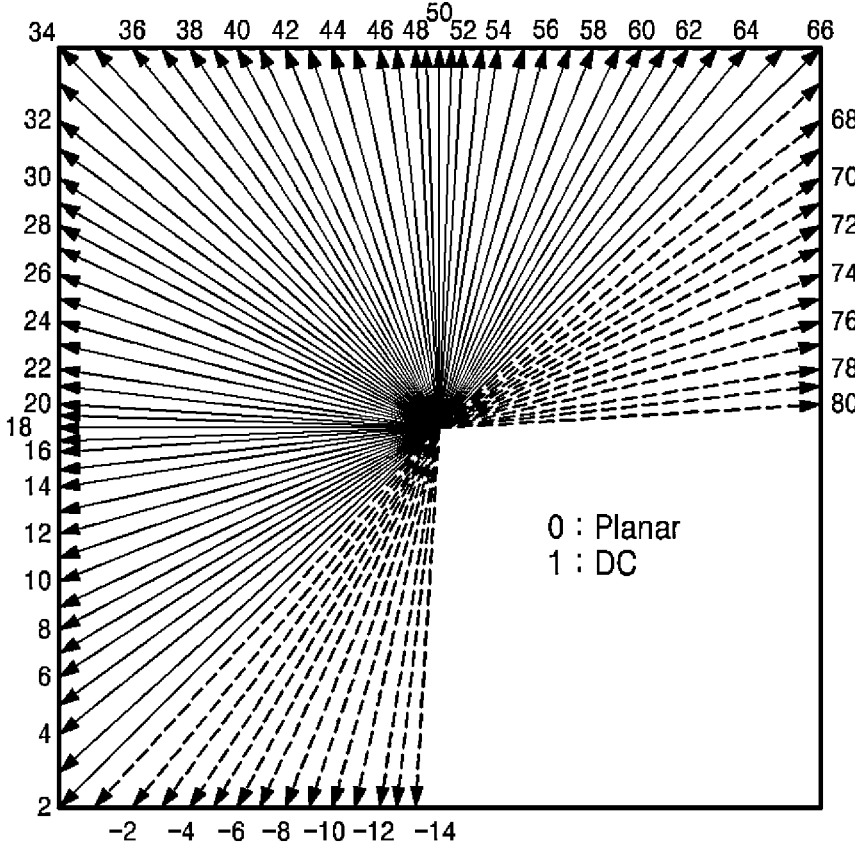

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this case, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and may also select an appropriate intra prediction mode to be used from tested modes. For example, the intra predictor 122 may calculate rate-distortion values by using a rate-distortion analysis for multiple tested intra prediction modes and may also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current block in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

Meanwhile, the inter predictor 124 may perform inter prediction by using bi-prediction. In the case of bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and including information on two motion vectors is delivered to the entropy encoder 155. Here, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method is referred to as a merge mode.

In the merge mode, the inter predictor 124 selects a predetermined number of merge candidate blocks (hereinafter, referred to as a "merge candidate") from the neighboring blocks of the current block.

Figure 4:
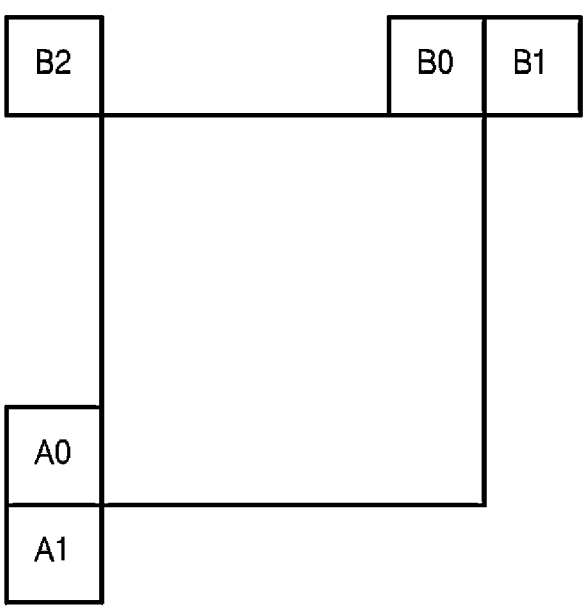
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is a special case of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be acquired by applying a pre-defined function (e.g., center value and average value computation, and the like) to the motion vector predictor candidates. In this case, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this case, information on the motion vector difference and information on the reference picture used for predicting the current block are encoded.

Meanwhile, the motion vector predictor may also be determined by a scheme of selecting any one of the motion vector predictor candidates. In this case, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. Here, the transform area subblock may be one of two rectangular blocks having a size ratio of 1:1 based on a horizontal axis (or vertical axis). In this case, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this case, a flag (cu_sbt_quad_flag) dividing the corresponding splitting is additionally encoded by the entropy encoder 155 and signaled to the video decoding apparatus.

Meanwhile, the transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a 2D coefficient array to a 1D coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information, such as a CTU size, a CTU split flag, a QT split flag, an MTT split type, an MTT split direction, etc., related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (in the case of the merge mode, a merge index and in the case of the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer 165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, etc., which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
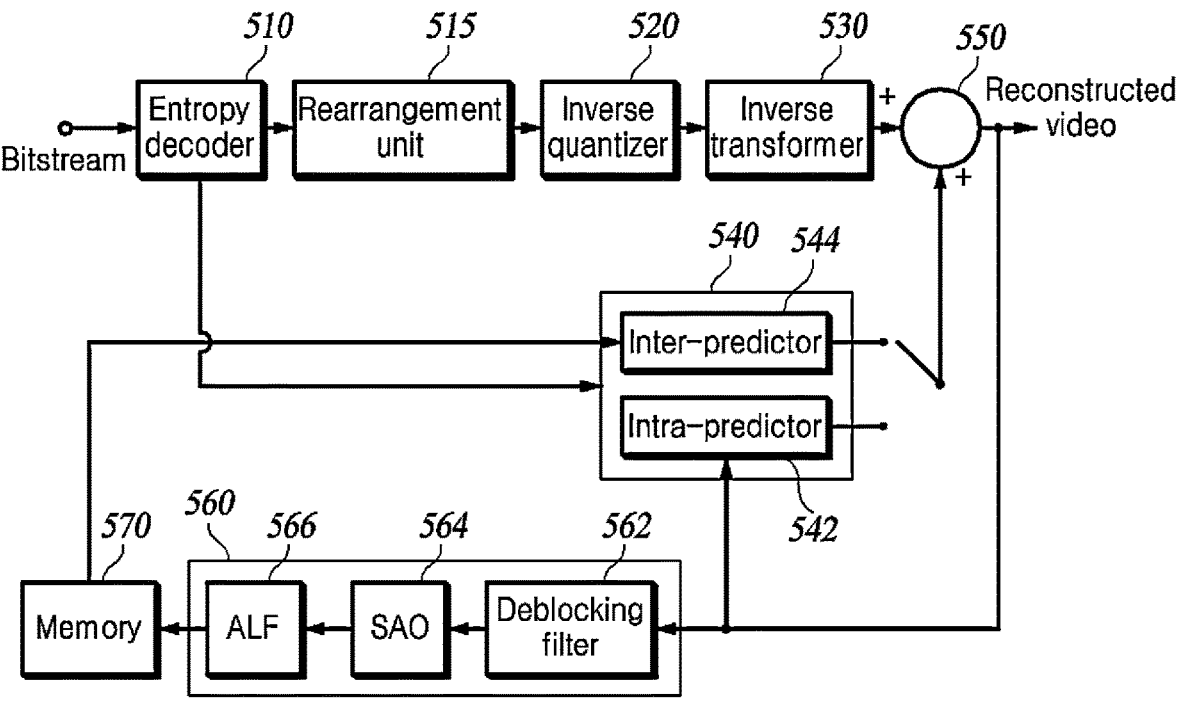
FIG. 5 is a block diagram of a video decoding apparatus that may implement the techniques of the present disclosure.

FIG. 5 is a functional block diagram of a video decoding apparatus that may implement the technologies of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for reconstructing the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur, or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

Meanwhile, when the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by reconstructing the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

The present disclosure in some embodiments relates to encoding and decoding video images as described above. More specifically, the present disclosure provides a video coding method and an apparatus that utilize an in-loop filter based on upsampling or super-resolution techniques in processing a video signal through downsampling to the compression and upsampling to the reconstruction thereof.

The following embodiments may be performed by the loop filter unit 180 in the video encoding device. The following embodiments may also be performed by the loop filter unit 560 in the video decoding device.

The video encoding device in the in-loop filtering of the reconstructed frame may generate signaling information associated with the present embodiments in terms of optimizing rate distortion. The video encoding device may use the entropy encoder 155 to encode the signaling information and transmit the encoded signaling information to the video decoding device. The video decoding device may use the entropy decoder 510 to decode, from the bitstream, the signaling information associated with in-loop filtering of the reconstructed frame.

In the following description, the term "target block" may be used interchangeably with the current block or coding unit (CU). The term "target block" may refer to some region of the coding unit.

Further, the value of one flag being true indicates when the flag is set to 1. Additionally, the value of one flag being false indicates when the flag is set to 0.

I. Convolutional Neural Network (CNN)

A CNN refers to a neural network composed of a plurality of convolutional layers and a pooling layer and is a deep learning technique known to be best suited for image processing. Convolutional layers use multiple kernels or filters to extract feature maps (also known as 'features'). The kernel coefficients that constitute the filters are the parameters that are determined during the learning process.

Among the convolutional layers of the CNN, the front layer, which is close to the input, extracts feature maps that respond to simple, low-level image features such as lines, dots, or faces, while the back layer, which is close to the output, extracts feature maps that respond to higher-level features such as textures and object parts.

Figure 6:
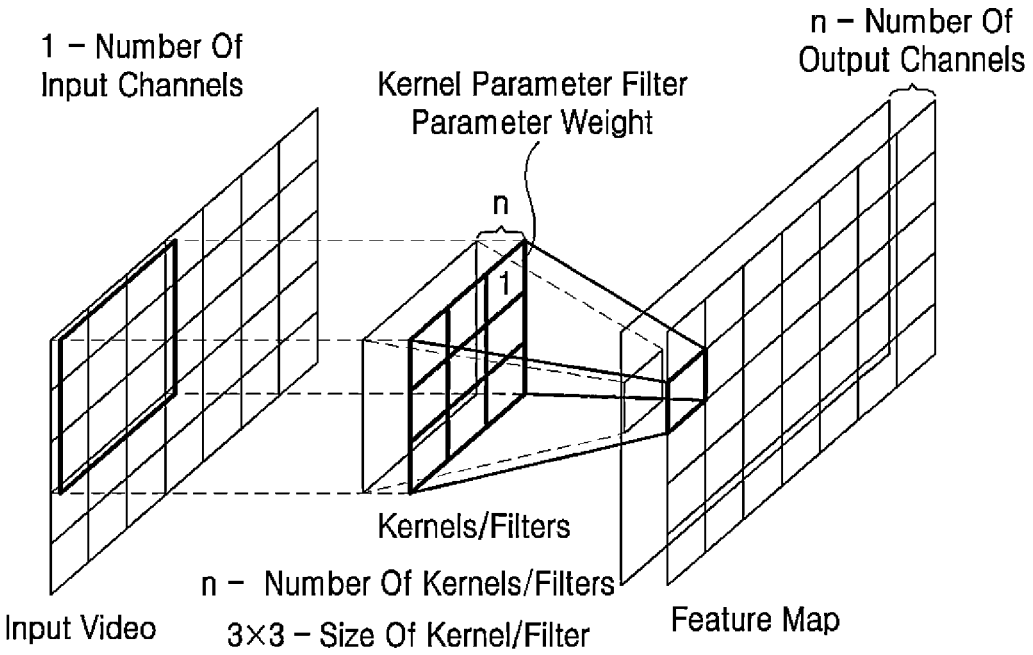
FIG. 6 is a diagram illustrating the operation of a convolutional layer.

FIG. 6 is a diagram illustrating the operation of a convolutional layer according to at least one embodiment of the present disclosure.

The convolutional layer utilizes convolutional operations to generate a feature map from an input image. FIG. 6 illustrates a kernel (or filter) with a kernel size of 3×3. The kernel size is also referred to as filter size. The kernel has a kernel parameter or filter parameter, also referred to as a weight. The kernel illustrated in FIG. 6 has a total of nine kernel parameters. The kernel parameters may be initially set to arbitrary values, and the values of parameters may be updated based on training.

The convolutional layer performs a convolutional operation by using a block equal to the kernel size in the input image. In this case, the block of the size of the kernel in the input image is referred to as a window.

When filtering on the input image is performed in a raster-scan order, the displacement of the window is called a stride. In the example of FIG. 6, stride is 1. If stride is set to 2, the convolution operation is performed with the window offset by 2 samples, resulting in the horizontal and vertical dimensions of the feature map being half the horizontal and vertical dimensions of the input image.

As described above, a convolutional layer may include a plurality of filters. The number of filter(s) or the number of kernel(s) is referred to as a channel(s). So, the number of channels is equal to the number of filters. The number of filters also determines the dimensionality of the feature map.

Padding refers to a method of expanding the input data by filling in a certain value around the input data before performing a convolutional operation. Padding is primarily used to adjust the spatial size of the output data. The value used for padding may be determined by hyperparameters, but zero-padding is commonly used. If padding is not used, the spatial size of the output data decreases with each convolutional layer, which can cause boundary information to be lost. Thus, as a remedy, padding is used. Padding may be thus used to equalize the spatial size between the output data and input data of the convolutional layer.

Figure 7:
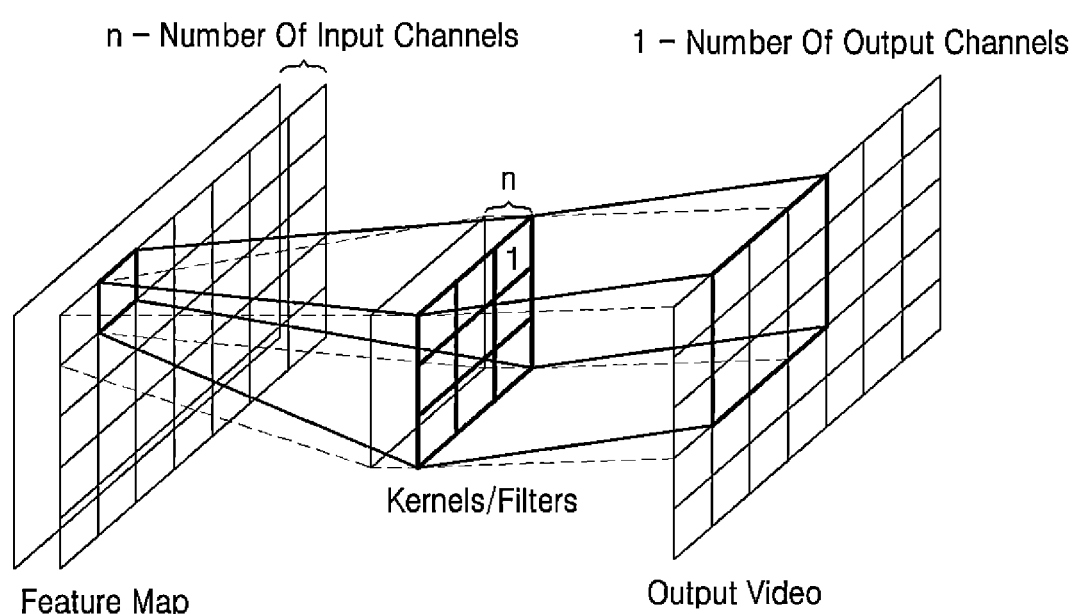
FIG. 7 is a diagram illustrating the operation of a deconvolution layer.

FIG. 7 is a diagram illustrating the operation of a deconvolution layer, according to at least one embodiment of the present disclosure.

The deconvolution layer performs the opposite operation of the convolution layer. The deconvolution layer takes a feature map as input and produces a desired data image as output. The deconvolution layer uses the same terminology as the convolution layer. When stride is 1, the horizontal and vertical dimensions of the feature map are the same as the horizontal and vertical dimensions of the output data, as shown in the example in FIG. 7. When stride is 2, the width and height of the output data is twice the width and height of the feature map.

Figure 8:
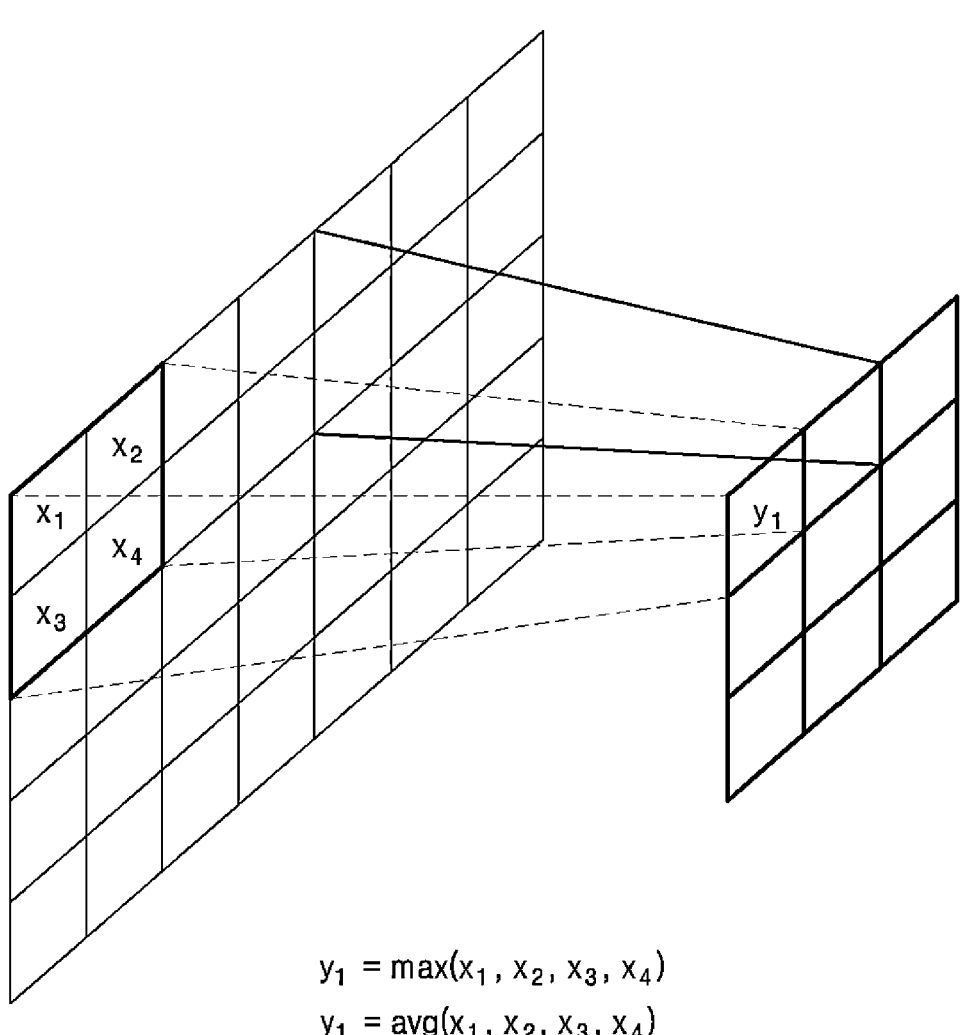
FIG. 8 is a diagram illustrating the operation of a pooling layer.

FIG. 8 is a diagram illustrating the operation of a pooling layer, according to at least one embodiment of the present disclosure.

The pooling layer performs pooling, which is the process of subsampling the feature map generated by the convolutional layer. The pooling layer utilizes a 2×2 window to select samples such that the output is half the horizontal and vertical dimensions of the input, respectively. In other words, the pooling layer is utilized to reduce the size of the input image or input feature map by condensing a 2×2 region into a single sample. As illustrated in FIG. 8, pooling methods include max pooling which selects the maximum value in the 2×2 region, and average pooling which generates an average of the 2×2 regions. Unlike convolutional layers, pooling layers do not include variables that need to be trained, and keep the number of channels in the input to be the same in the output.

The opposite of a pooling layer is defined as an unpooling layer. An unpooling layer acts as the opposite of a pooling layer, increasing dimensionality, and is typically used after a deconvolution layer.

A convolutional encoder-decoder structure is a network structure composed of pairs of convolutional layers and deconvolutional layers. A convolutional encoder is composed of a convolutional layer and a pooling layer to output a feature map (or feature vector) from the input image. The final output vector of a convolutional encoder is also referred to as a latent vector. A convolutional decoder is composed of a deconvolution layer and an unpacking layer to generate an output image from the feature map or latent vector.

The inputs and outputs of the convolutional encoder-decoder may be set variably depending on the purpose of the application and network. For example, the inputs and outputs may be optical flow maps, saliency maps, image frames, and the like.

Figure 9:
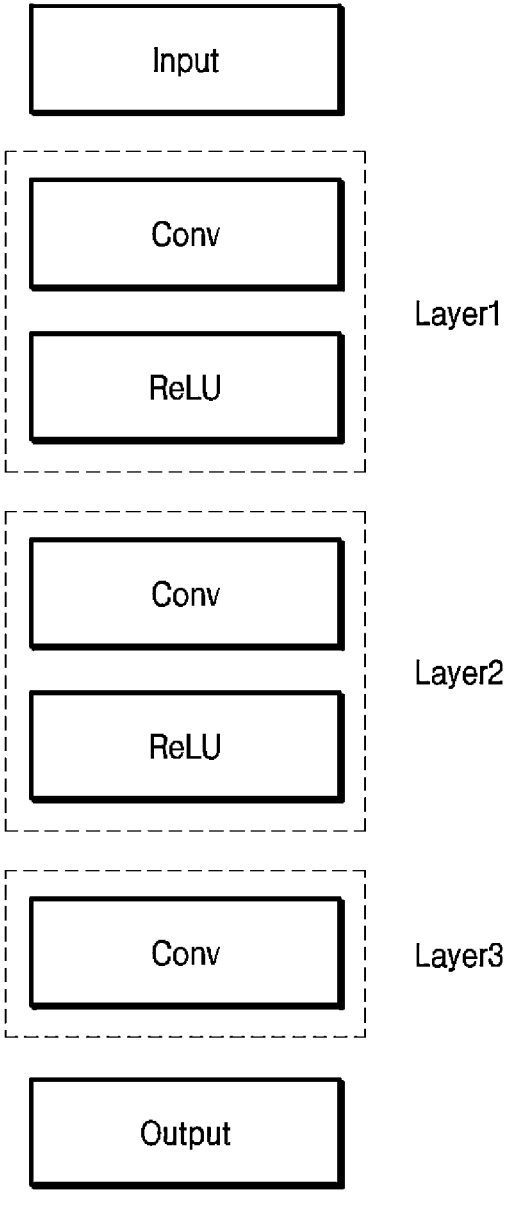
FIG. 9 is a diagram illustrating a Single Image Super Resolution (SISR) network.

FIG. 9 is a diagram illustrating a SISR network.

One example of an application of CNN is Single Image Super Resolution (SISR). The SISR network produces a high-resolution image as an output from a low-resolution input image. The SISR network may include multiple convolutional layers, as illustrated in FIG. 9. Each convolutional layer includes an activation function, such as a rectified linear unit (ReLU). The parameters of the SISR network may be trained such that the resulting Super Resolution (SR) image is close to the Ground Truth (GT).

Figure 10:
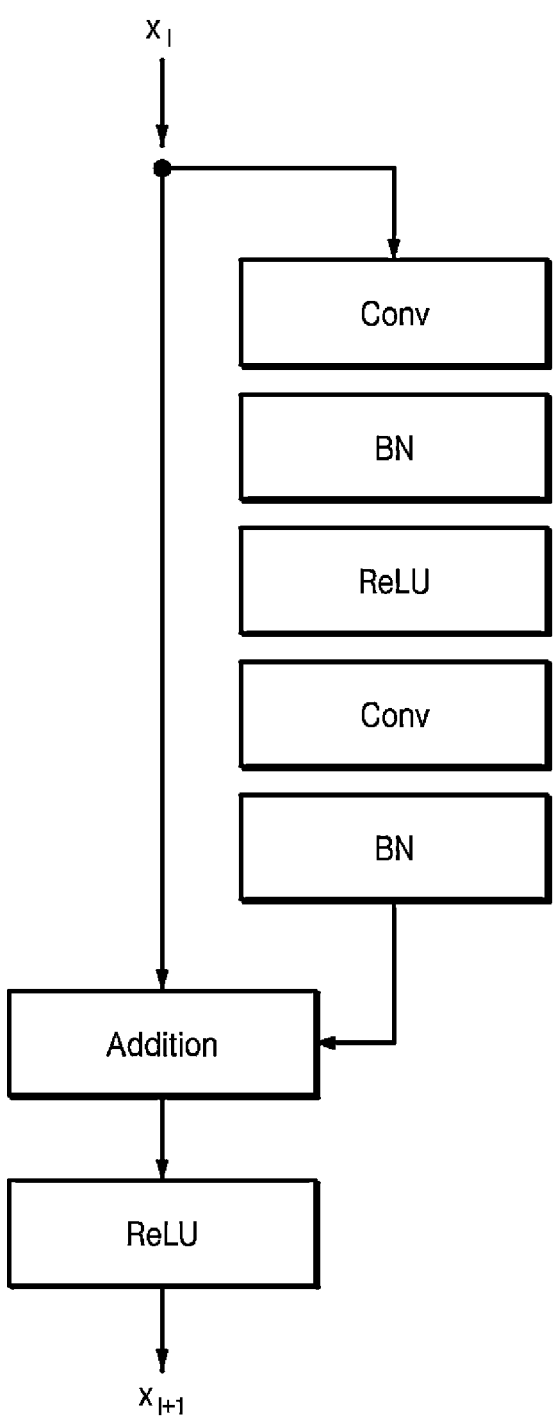
FIG. 10 is a diagram illustrating a residual block utilized in SISR.

SR methods using CNNs can improve SR performance by increasing the depth, meaning, for example, by increasing the number of convolutional layers. To overcome the problem of overfitting in learning that may occur with increasing depth, a residual block that may perform skip connections and residual learning may be utilized in the SISR network. The residual block includes a skip path in addition to a path for applying a convolutional operation to the input feature $x_1$, as illustrated in FIG. 10. In addition, the residual block may select the path of applying the convolutional operation or the skip path based on learning efficiency when generating the output $x_{1+1}$. In the example of FIG. 10, the residual block includes a batch normalization (BN) layer.

In one example, Enhanced Deep residual networks for SISR (EDSR) increase the performance of the network by increasing the depth by concatenating residual blocks in succession. Another example of Accurate Image Super-Resolution Using Very Deep Convolutional Networks (VDSR) is a Visual Geometry Group or VGG network-based CNN model that uses residual learning and a residual signal-based residual learning which adds a residual frame to the final output. VDSR adds the residual signal to the input signal by adding the residual signal at the very end of the network.

II. Adaptive Loop Filter (ALF)

Figure 11:
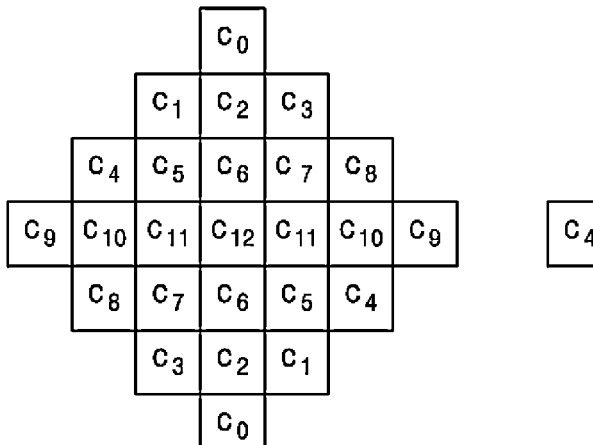
FIG. 11 is a diagram illustrating an adaptive loop filter (ALF).

The ALF 186, 566 of the VVC uses an adaptive linear filter that is based on the Wiener-Hopf equation to approximate the reconstructed video frame to the original frame. The video encoding device uses the output samples of the SAO 184 to calculate and transmit the filter coefficients of the ALF 186 based on rate-distortion optimization to the video decoding device. The ALFs 186, 566 are configured as 7×7 diamond shapes and 5×5 diamond shapes for luma and chroma samples, respectively, as shown in the example of FIG. 11. The filter shape and size may be determined by considering a tradeoff between coding efficiency and computational complexity. For example, using a symmetric FIR filter may reduce the computational complexity of the ALF 186, 566.

To derive the filter coefficients $c_i$ illustrated in FIG. 11, samples are utilized at the corresponding locations. The filtered sample I(x,y) at the current location (x,y) may be calculated as shown in Equation 1 by a 7-bit precision operation.

$$\tilde{I}(x, y) = I(x, y) + \left[ \left( \sum_{i=0}^{N-2} c_i r_i + 64 \right) \gg 7 \right] \qquad \text{Equation 1}$$

Herein, $r_i$ is the difference between the current sample and the neighboring samples, calculated according to Equation 2.

$$r_i = \min(b_i, \max(-b_i, I(x + x_i, y + y_i) - I(x, y))) + \qquad \text{Equation 2}$$
$$\min(b_i, \max(-b_i, I(x - x_i, y - y_i) - I(x, y)))$$

Here, $b_i$ is a clipping parameter.

The ALF 186, 566 utilizes at most 25 sets of filter coefficients for the luma component and applies 25 sets of filter coefficients to a 4×4 subblock. Based on the local block's gradient information computed by using the Laplacian filter, the 4×4 subblock is categorized into one of 25 classes. Specifically, the class classification index is derived from the combination of the five directional attributes, which represent the intensity and direction of the texture component, and the five activity attributes of the subblock. Additionally, geometric transforms such as 90-degree rotation, diagonal shifting, and vertical shifting may be applied to the filter coefficients before filtering. By using geometric transforms to account for different directionality, a greater variety of block characteristics may be processed by using a smaller set of filter coefficients.

In addition to the subblock level, the decision to apply may be made at the CTU level. For the chroma component, up to eight filters are used at the CTU level. The chroma ALF may be activated only if the luma ALF is activated at that level.

Meanwhile, an Adaptation Parameter Set (APS) is used to convey the ALF filter parameters, including sets of filter coefficients. As described above, up to 25 sets of filter coefficients may be calculated for the luma component and up to 8 sets of filter coefficients for the chroma component. If the same ALF coefficients are used for different slices, the index of the reference APS may be signaled instead of redundantly retransmitting ALF coefficients.

In video applications such as High-Dynamic Range (HDR) and Wide Color Gamut (WCG), the reconstruction of video colors is critical. Cross-Component ALF (CC-ALF) uses the correlation between the current chroma sample and the luma sample at that location to modify the chroma sample in parallel with the ALF. To generate the correction of the chroma sample from the inputted luma sample, the CC-ALF applies a linear filtering operation. In this case, a diamond-shaped FIR filter with no symmetry constraints is used as the CC-ALF.

III. Reference Picture Resampling (RPR)

In real-time video telecommunication, adaptive resolution change (ARC) is highly needed for demands such as adaptive video resolution and rapid streaming startup. Accordingly, the reference picture resampling (RPR) technique of the VVC may refer to a picture having a different resolution than the current picture.

Figure 12:
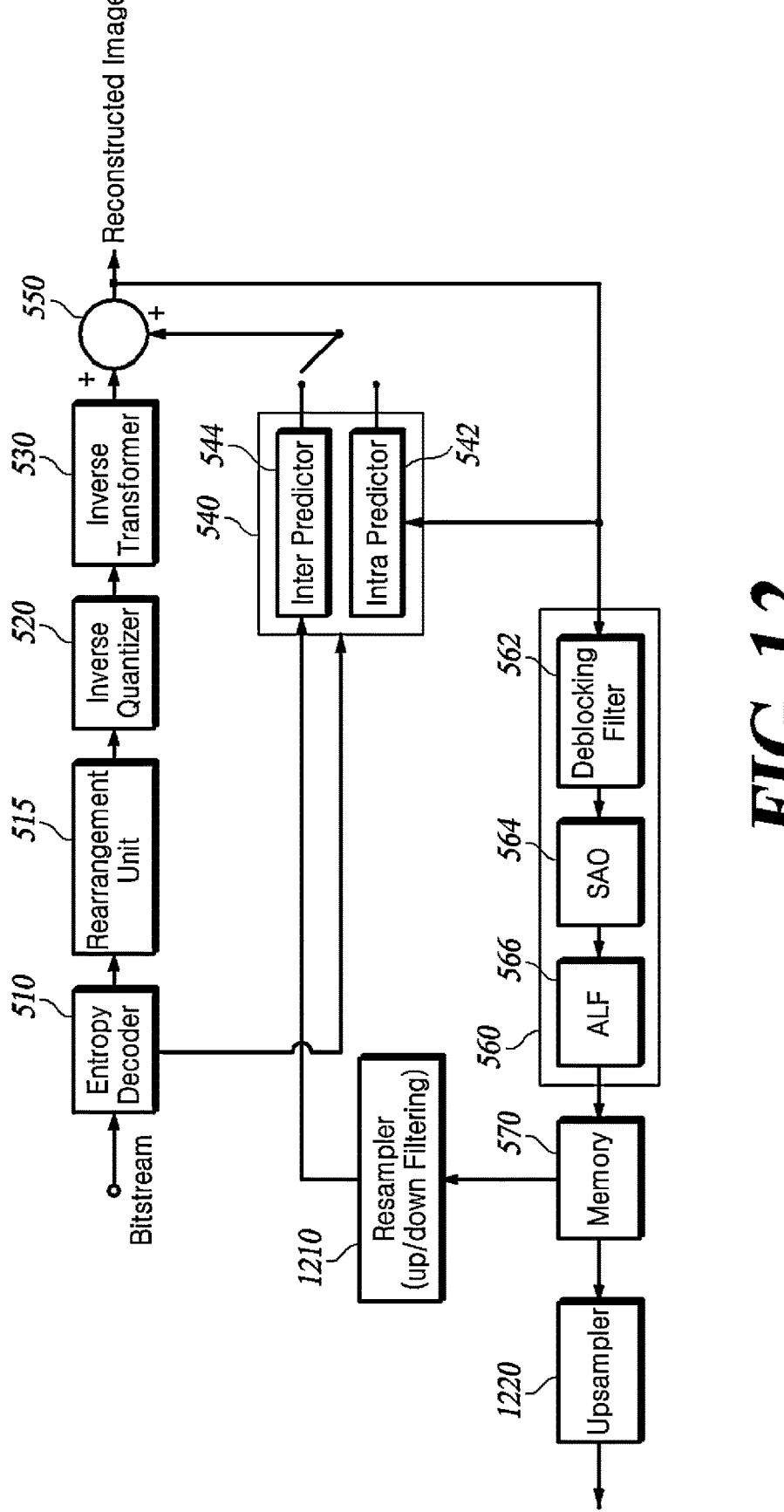
FIG. 12 is a block diagram of a video decoding device applied with reference picture resampling (RPR) technology.

FIG. 12 is a block diagram of a video decoding device with RPR technology.

Video frames downsampled by the video encoding device are encoded and transmitted, and video frames previously decoded by the video decoding device are stored in a decoded picture buffer (DPB) in the memory 570. If the video frame currently being reconstructed has a different size than the reference picture, a resampler 1210 in the video decoding device resamples (up- or down-scaling) the reference picture according to the size ratio, and scales the motion vector according to the size ratio in the motion prediction and compensation process. The decoded video frame is stored in the DPB without resampling. When outputting, the video decoding device has an upsampler 1220 for upsampling and reconstructing the downsampled video frame to its original size. However, the upsampling may result in the loss of high-frequency components, and thus the outputted video frame may suffer from problems such as blurring.

Hereinafter, embodiments of the present disclosure are described centered around the video decoding device, but they may be similarly applied to the video encoding device.

IV. EMBODIMENTS ACCORDING TO THE PRESENT DISCLOSURE

Hereinafter, an implementation of a resampling in-loop filter (RIF) is described.

Figure 13:
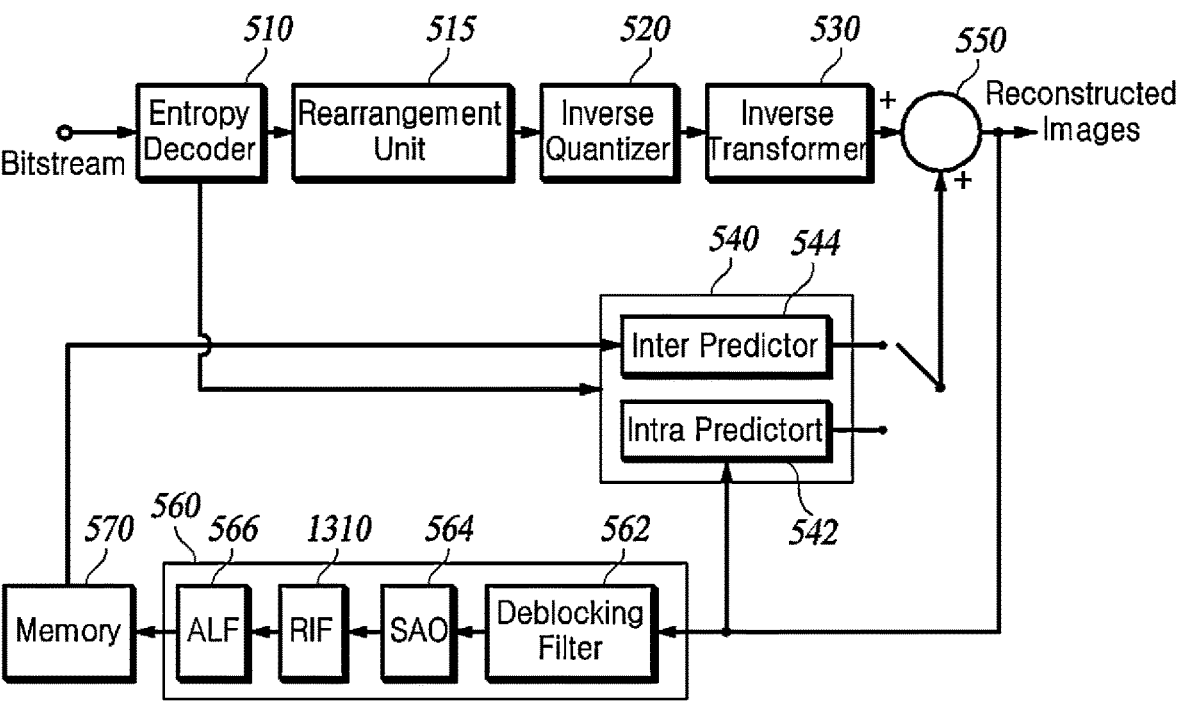
FIG. 13 is a block diagram of a video decoding device including a resampling in-loop filter (RIF), according to at least one embodiment of the present disclosure.

FIG. 13 is a block diagram of a video decoding device including a resampling in-loop filter, according to at least one embodiment of the present disclosure.

In the video decoding device according to at least one embodiment of the present disclosure, a RIF (resampling in-loop filter) 1310 may be provided to replace any of the deblocking filter 562, SAO (sample adaptive offset filter) 564, and ALF (adaptive loop filter) 566 that constitute a conventional in-loop filter, or the RIF 1310 may be inserted in the middle of a conventional in-loop filter. In the example of FIG. 13, the RIF 1310 is positioned between the SAO 564 and the ALF 566.

If a compressed image is inputted already downsampled, the RIF 1310 upsamples and reconstructs the compressed image to the original resolution. Here, the original resolution refers to the resolution of the original frame. If the input video comes in at the original resolution or the flag to perform upsampling is not enabled, no upsampling by the RIF 1310 is performed.

In this case, techniques applicable to VVC RPR techniques may be used as filters to downsample the original frames at the original resolution. Specifically, the downsampling may be performed by using a low-bandpass filter utilizing a windowed sync function. Further, during downsampling, the horizontal and vertical dimensions of the original frame are divided by a scale value. In this case, the downsampled dimensions are truncated or rounded to the nearest whole number. For example, if the size in the horizontal direction is W and the scale value is S, the downsampled length is expressed as $W_d=$floor (W/S), where the floor is a descending function. Here, the floor is a descending function.

In addition to simply dividing by the scale value, pixels may be padded at the frame boundaries such that the downsampled result is an even number or a multiple of four.

The RIF 1310 upsamples the video frame that is currently being reconstructed. The upsampling scale may be, but is not necessarily limited to, 2× horizontally or 2× vertically. For example, upsampling in decimal increments, such as 1.5×, is allowed, and scaling by more than 2×, such as 3×, 4×, and the like is also allowed. The horizontal and vertical lengths of the original resolution are signaled for reconstruction to the original resolution due to the upsampling. The RIF 1310 may utilize any of the following techniques to upsample the video frame under the current reconstructing.

In one example, the RIF 1310 utilizes a finite impulse response (FIR) filter to upsample the video frames. Specifically, the interpolation filter applied to the generation of prediction blocks during inter prediction may be utilized for upsampling.

As another example, the RIF 1310 upsamples the video frames by using a neural network super resolution (NNSR) technique that performs upsampling based on a neural network. Specifically, a transposed convolution may be utilized, or a convolutional process may be performed after upsampling. The image may be upsampled by using the inverse of the mathematical operations used in a convolution, that is, by using a transposed convolution, and the kernel used may be updated by using learning. A transposed convolution may be implemented based on the deconvolution layer illustrated in FIG. 7. Additionally, network architecture and component technology for super-resolution enhancement such as SISR and EDSR described above may be utilized as NNSR.

Figure 14:
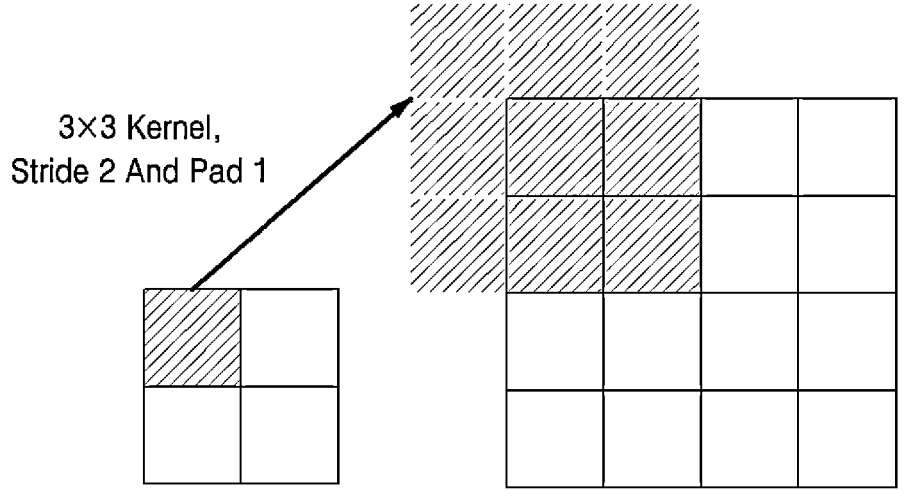
FIG. 14 is a diagram illustrating a transposed convolution operation.

First, a transposed convolution operation may be implemented, as illustrated in FIG. 14. In the transposed convolution operation illustrated in FIG. 14, the RIF 1310 may utilize a 3×3 kernel, stride 2, and padding 1 to generate an output that is increased by more than the horizontal and vertical dimensions of the input feature map. As shown in the example of FIG. 14, a single pixel of the input feature map may be multiplied by the 3×3 kernel to generate a corresponding set of output pixels.

Figure 15:
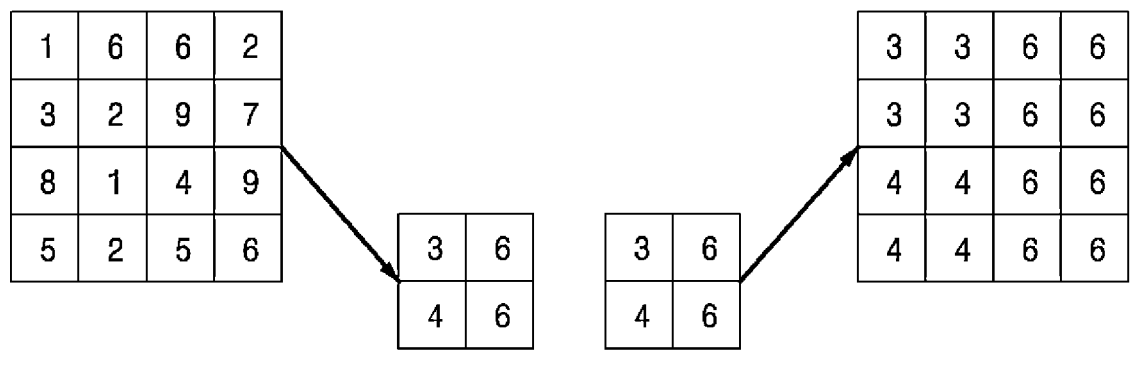
FIG. 15 is a diagram illustrating an unpooling operation.

Additionally, the RIF 1310 may perform upsampling by using the unpooling method described above. Unpooling methods that perform the inverse process of the pooling method illustrated in FIG. 8 include max unpooling and average unpooling. The max unpooling memorizes the position index of the largest value in the matrix at the time of maximum pooling and then places the sample value at the position indicated by the position index at the time of unpooling. In this case, max unpooling may fill the neighboring pixels with the same value, or max unpooling may fill the neighboring pixels with zero. Meanwhile, the average unpooling performs upsampling under the assumption that the input value is the average of the output values. The average unpooling is illustrated in FIG. 15.

Additionally, the RIF 1310 may perform convolution after upsampling by using the nearest neighbor or using bilinear-based or bicubic-based interpolation. In this case, since the input image is already upsampled to the original resolution, a denoising neural network may be used to apply the convolution to the upsampled image.

Figure 16:
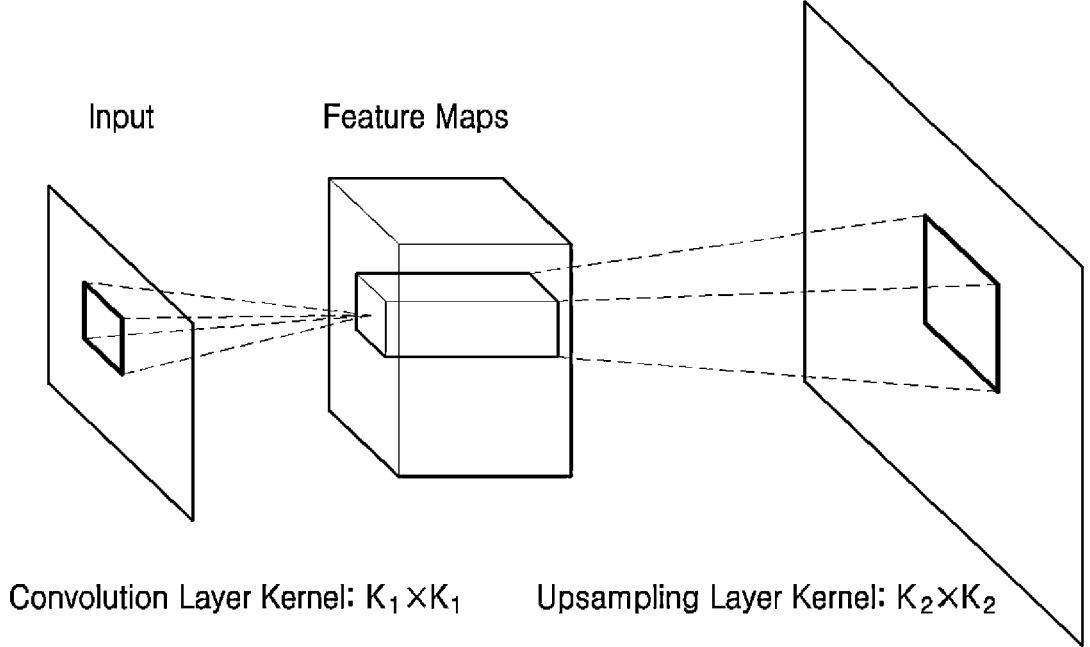
FIG. 16 is a diagram illustrating an upsampling technique utilizing neural network super resolution (NNSR), according to at least one embodiment of the present disclosure.

FIG. 16 is a diagram illustrating an upsampling technique utilizing NNSR, according to at least one embodiment of the present disclosure.

In the example of FIG. 16, on a downsampled input image, the NNSR performs upsampling by using multiple convolutional layers and unpooling layers. In the example of FIG. 16, $K_1 \times K_1$ represents the resolution of the downsampled input image and $K_2 \times K_2$ represents the resolution of the upsampled output image. Further, the upsampling layer may be implemented as an unpooling layer as described above.

Meanwhile, the location of the RIF 1310 may be anywhere within the in-loop filter 560 in the video decoding device, as shown in the example of FIG. 13. For example, the RIF 1310 may be located at any one of the deblocking filter 562, SAO 564, and ALF 566.

Figure 17:
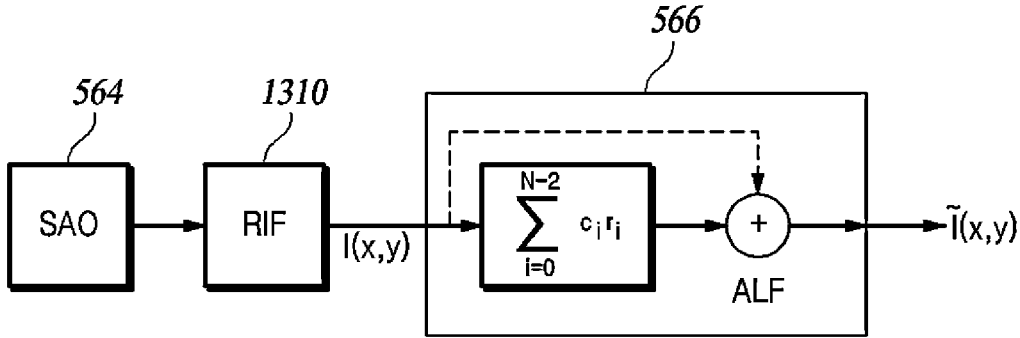
FIG. 17 is a diagram illustrating the location of the application of RIF, according to at least one embodiment of the present disclosure.

For example, the RIF 1310 may be located after the SAO 564 and before the ALF 566, as in the example of FIG. 13. So, the video decoding device may input to the ALF 566 signals generated by applying an FIR-based upsampling filter to the downsampled output samples that have passed through the SAO 564, as in the example of FIG. 17. Here, the input signal to the ALF 566 is denoted by I(x,y).

The filter coefficients of the ALF 566 may be calculated by using the Winer-hopf equation. Specifically, the filter coefficients may be derived to closely approximate the original image after the input signal I(x,y) is passed through the ALF 566. The conventional ALF 566 removes quantization noise between input video frames and output video frames having the same resolution, but in this embodiment, the input video frames and output video frames have different resolutions, so besides removing the quantization noise, filter coefficients may be derived to mitigate blurring effects caused by the upsampling process. While using the same structure and the same filter coefficient derivation method as the conventional ALF 566, the addition of the RIF 1310, as described above, may replace the purpose of the ALF 566.

In this case, the ALF 566 may be a two-dimensional linear filter configured in a diamond or square shape. The ALF 566 may be configured as a 7×7 diamond shape and a 5×5 diamond shape, as shown in the example of FIG. 11, to be used for luma and chroma samples, respectively. The filter shape and size may be determined by considering a tradeoff between coding efficiency and computational complexity. For example, the computational complexity of the ALF 566 may be reduced by using a symmetric FIR filter.

To derive the filter coefficient $c_i$ illustrated in FIG. 11, a sample at the location is utilized. The filtered sample I(x,y) at the current position (x,y) may be calculated as shown in Equation 1, based on a 7-bit precision operation. In Equation 1, $r_i$, the difference between the current sample and the neighboring sample, may be calculated according to Equation 2. In Equation 2, $b_i$ is a clipping parameter.

The ALF 566 utilizes at most 25 sets of filter coefficients for the luma component and applies them to a 4×4 subblock. Based on the local block's gradient information computed by using the Laplacian filter, the 4×4 subblock is categorized into one of 25 classes. Specifically, the class classification index is derived from the combination of the five directional attributes, which represent the intensity and direction of the texture components, and the five activity attributes of the subblock. Additionally, geometric transforms such as 90-degree rotation, diagonal shifting, and vertical shifting may be applied to the filter coefficients before filtering. By using geometric transforms to account for different directionality, a greater variety of block characteristics may be processed by using a smaller set of filter coefficients.

Below, the operation of the RIF 1310 in the inter-prediction process is described.

When the RIF 1310 is used in the inter-prediction process for the current frame, the video decoding device may use one of the following techniques for inter prediction.

First, the video decoding device performs the inter prediction by using a fixed frame size. The video decoding device converts the reconstructed frames to the fixed resolution and stores them in the DPB in the memory 570. The video decoding device then performs motion prediction and compensation between the current frame and a reference frame having a fixed resolution stored in the DPB. The video decoding device may output a frame of a fixed size after scaling it to the output resolution. Alternatively, if the fixed resolution and the output resolution are the same, the video decoding device outputs the frame without any other conversion.

Second, if the RIF 1310 is used for the current frame in the inter prediction, there may be a resolution difference between the current frame and the reference frame.

The video decoding device scales the reference frame to fit the size of the current frame and then performs inter prediction. By default, the frames present in the DPB may be scaled up or down based on a size ratio between the reference frame and the current frame.

Alternatively, the video decoding device performs inter prediction after changing the current frame to fit the size of the reference frame. In this case, the video decoding device scales the predicted motion vector to fit the size of the changed current frame.

If the reconstructed frames in the DPB have more than one size, the video decoding device may perform the inter prediction based on more than one size. For this purpose, one or more of the size of the current frame, the size of the reference frames, and an output size may be selected. When the inter prediction is performed based on the one or more sizes, the video decoding device may determine a final reference resolution, may scale the predicted motion information accordingly, and store the scaled motion information.

Third, if the current frame and the reference frame have different resolutions, the video decoding device may perform the motion prediction after the spatial and temporal motion candidates are scaled to match the resolution at the location of the candidate block. Alternatively, the video decoding device may perform inter prediction by considering only the spatial motion candidates without considering the temporal motion candidates. Alternatively, for the temporal motion candidates, the video decoding device may use the candidate blocks at the unscaled position as the motion candidates.

Below, the operation of the DPB in relation to the RIF 1310 is described.

Frames that have been in-loop filtered by the RIF 1310 are stored in the DPB in the memory 570. The video decoding device performs inter prediction after up- or down-scaling the frames present in the DPB based on a size ratio between the reference frame and the current frame. To store frames in the DPB, the video decoding device uses one of the following techniques.

The video decoding device stores all frames, regardless of the size of the frame, in the existing DPB. In the process, the video decoding device may select the size of the frames before and after applying the RIF 1310 to store frames having the selected size, or store frames having both sizes. For example, a video frame that is downsampled to a scale of ½ may be stored in a conventional DPB by using ¼ as much storage space.

When the order of reference frames is managed in a reference picture list, the video decoding device may utilize a conventional forward reference picture list, RefPicList[0] (hereinafter referred to as L0), and a reverse reference picture list, RefPicList[1] (hereinafter referred to as L1), to manage the order of reference frames.

Alternatively, if a frame after in-loop filtering has a changed resolution relative to the original frame, the video decoding device stores the changed frame at a specific index in the reference picture list. For example, the changed frame may be stored at a second index, RefPictList[0][1] and RefPictList[1][1].

If the RIF 1310 is used for the current frame during the inter-prediction process, the video decoding device may utilize multiple DPBs (decoded picture buffers) with different resolutions between the current frame and the reference frame.

The video decoding device may separate the frames before and after applying the RIF 1310 and store them in different DPBs. So, one DPB may store the downscaled frame, and another DPB may store the frame with the output resolution.

The following describes the signaling of the syntax associated with the RIF 1310.

First, signaling associated with the behavior of the RIF 1310 is described.

Whether the RIF 1310 is enabled or disabled may be controlled at a higher level, such as a video sequence level, picture level, or the like. For example, a flag may be represented on SPS that is at the video sequence level to indicate whether the RIF 1310 is available. If the flag is true, the RIF 1310 is available, and if the flag is false, the RIF 1310 is not available.

Additionally, the picture level, PPS, may be utilized to control whether the RIF 1310 is enabled or disabled in the same manner as the SPS. For example, the RIF 1310 may be enabled if a corresponding flag on the PPS is true. In this case, the resolution of the output signal of the RIF 1310 is changed with respect to the signal inputted to the in-loop filtering. On the other hand, if the flag is false, the RIF 1310 is not enabled. In this case, there is no change in resolution between the input and output of the in-loop filter.

Next, the signaling associated with the scale value of the RIF 1310 is described.

When a flag indicating whether the RIF 1310 is enabled or disabled is signaled at the video sequence level or picture level, the scale value of a changed resolution is determined to be 2. In addition, it may be further determined whether to apply the scale value of 2 or 1 in the horizontal or vertical direction.

A scale value other than the scale value of 2 may be selected from a plurality of available scale values. In this case, the selected scale value may be indicated by using an index. For example, if the index x_scale_index is 0, the original resolution may be maintained, if x_scale_index is 1, the scale value in the x-axis direction may be set to 2, and if x_scale_index is 2, the scale value in the x-axis direction may be set to 4.

In addition to explicitly signaling the scale values by using the indexes, the video decoding device may determine the final scale by using the parameters passed to the video decoding device and an arithmetic expression.

Next, signaling associated with the upsampling filter of the RIF 1310 is described.

When a neural network is used as the RIF 1310, an index indicating one of many candidates may be signaled. The index may dictate a corresponding set of parameters of the neural network. Based on the signaled index, the video decoding device establishes a neural network for use in super-resolution. The candidate neural networks may be pre-trained according to quantization parameters, scale values, and the like. The video encoding device and the video decoding device may store and use neural networks of the same structure and corresponding parameters.

To adaptively upsample to the video content, a set of parameters of the neural network utilized by the video encoding device is stored in the bitstream and then transmitted. The parameter set may be stored in an adaptation parameter set (APS) when it is transmitted.

When a FIR filter is used as the RIF 1310 and a frame is reconstructed with the ALF 566, a corresponding set of filter coefficients may be signaled while stored in the APS. In this case, one of a plurality of FIR filters may be utilized based on the scale value.

Next, the signaling associated with the output resolution of the RIF 1310 is described.

The output resolution obtained after performing the RIF 1310 is stored on the SPS.

The output resolution obtained after performing the RIF 1310 is calculated by multiplying the downsampled transmitted image by a predetermined scale value.

The output resolution obtained after performing RIF 1310 is the same as the original resolution.

In some cases, the output resolution obtained after performing RIF 1310 is different from the original resolution. In such cases, the output resolution may be stored in and transmitted from the SPS or may be calculated by multiplying by a predetermined scale value.

By setting a maximum resolution of the RIF (1310) output, the output resolution may be limited not to exceed the maximum resolution. Further, by setting a minimum resolution of the RIF (1310) input, the input resolution may be controlled so that the input resolution is not less than the minimum resolution when downsampling the original video frames.

Figure 18:
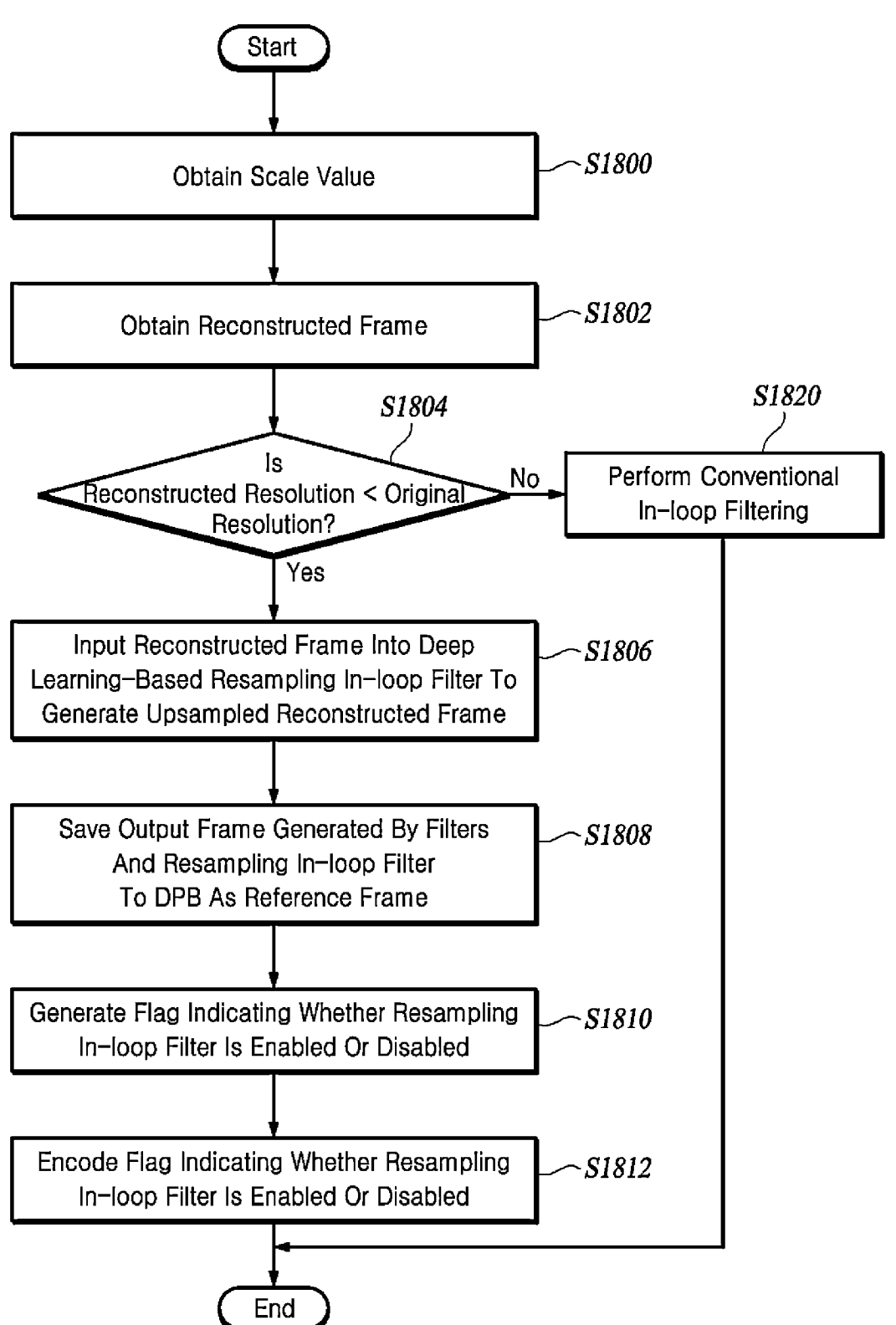
FIG. 18 is a flowchart of a method performed by a video encoding device for upsampling a reconstructed frame, according to at least one embodiment of the present disclosure.
Figure 19:
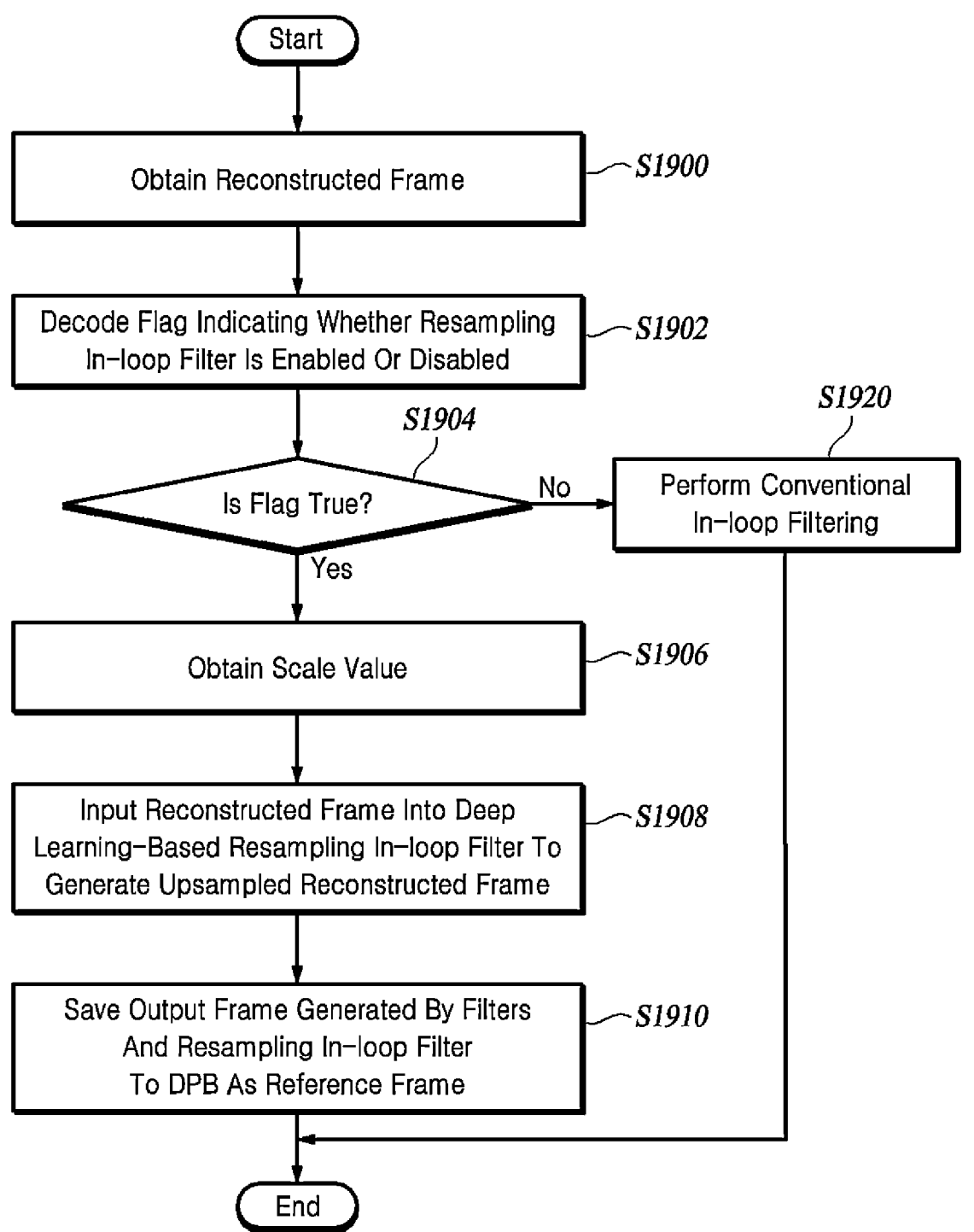
FIG. 19 is a flowchart of a method performed by a video decoding device for upsampling a reconstructed frame, according to at least one embodiment of the present disclosure.

Referring now to FIGS. 18 and 19, a method of upsampling a reconstructed frame based on an RIF is described.

FIG. 18 is a flowchart of a method performed by the video encoding device for upsampling a reconstructed frame, according to at least one embodiment of the present disclosure.

The video encoding device obtains a scale value (S1800).

Herein, the scale value represents a resolution difference between the reconstructed frame and the original frame. Further, the reconstructed frame is a frame that has reconstructed the original frame in advance according to an inter prediction of the video encoding device.

On the other hand, if the original frame is downsampled, the scale value may be set to 2.

Alternatively, in terms of optimizing rate distortion, the video encoding device may determine the scale value, encode an index indicative of the scale value, and pass the scale value to the video decoding device.

The video encoding device obtains the reconstructed frame (S1802).

The video encoding device checks the scale value (S1804).

If the resolution of the reconstructed frame based on the scale value is less than the resolution of the original frame (Yes in S1804), the video encoding device performs the following steps of S1806 and S1812.

The video encoding device inputs the reconstructed frame into the deep learning-based resampling in-loop filter to generate an upsampled reconstructed frame (S1806). Here, the resampling in-loop filter replaces one of the filters, including the deblocking filter, the SAO filter, and the adaptive loop filter, or is inserted between the filters. The upsampled reconstructed frame has a resolution of the original frame.

In one example, in terms of optimizing for rate distortion, the video encoding device determines an index that indicates one of a plurality of neural network candidates to the resampling in-loop filter. Subsequently, the video encoding device may encode the determined index. At this time, each of the neural network candidates may be pre-trained based on a quantization parameter and a scale value.

Alternatively, the video encoding device may encode a parameter set of the neural network selected as the resampling in-loop filter out of a plurality of neural network candidates. In this case, the parameter set may be signaled while stored in the APS.

As another example, when a FIR filter is used as the resampling in-loop filter and a frame is reconstructed with ALF, the video encoding device may utilize one of a plurality of FIR filters based on a scale value. The video encoding device may signal the corresponding set of filter coefficients stored in the APS.

The video encoding device stores the output frame generated by the filters and the resampling in-loop filter in the DPB as a reference frame (S1808).

The video encoding device determines a flag indicating whether to use the resampling in-loop filter (S1810). The video encoding device may determine the flag indicating whether to use the resampling in-loop filter based on whether the original frame is downsampled based on a scale value. For example, if the original frame is downsampled, the video encoding device may set the flag to true.

The video encoding device may encode a flag indicating whether to use the resampling in-loop filter (S1812).

On the other hand, if the resolution of the reconstructed frame is the same as the resolution of the original frame (No in S1804), the video encoding device performs conventional in-loop filtering, where the resampling in-loop filter is excluded (S1820).

In this case, the video encoding device may set a flag indicating whether to use the resampling in-loop filter to false and then encode the set flag. Alternatively, the video encoding device may not transmit the flag indicating whether to use the resampling in-loop filter. If the flag indicating whether to use the resampling in-loop filter is not transmitted, the video decoding device may infer the value of the flag to be false.

FIG. 19 is a flowchart of a method performed by the video decoding device for upsampling a reconstructed frame, according to at least one embodiment of the present disclosure.

The video decoding device obtains a reconstructed frame (S1900). Here, the reconstructed frame is a frame that has reconstructed the original frame in advance according to an inter prediction of the video decoding device.

The video decoding device decodes a flag indicating whether the resampling in-loop filter is enabled or disabled from the bitstream (S1902) and checks the flag (S1904).

On the other hand, if the flag indicating whether the resampling in-loop filter is enabled or disabled is not transmitted, the video decoding device may infer that the value of the flag is false.

If the flag indicating whether to use the resampling in-loop filter is true (Yes in S1904), the video decoding device performs the following steps from S1906 onward.

The video decoding device obtains a scale value (S1906). Here, the scale value represents a resolution difference between the reconstructed frame and the original frame.

If the flag indicating whether the resampling in-loop filter is enabled is true, the scale value may be set to 2.

Alternatively, the video decoding device may decode an index indicative of the scale value from the bitstream and set the scale value based on the index.

To increase the resolution of the reconstructed frame by the scale value, the video decoding device may input the reconstructed frame into a deep learning-based resampling in-loop filter and thereby generate an upsampled reconstructed frame (S1908). Here, the resampling in-loop filter replaces one of the filters, including the deblocking filter, the SAO filter, and the adaptive loop filter, or is inserted between the filters. The upsampled reconstructed frame has a resolution of the original frame.

In one example, the video decoding device may decode an index indicative of one of a plurality of neural network candidates from the bitstream and then set a resampling in-loop filter based on the index. Each of neural network candidates may be pre-trained based on a quantization parameter and a scale value.

Alternatively, the video decoding device may decode the parameter set of the resampling in-loop filter from the bitstream. In this case, the parameter set may be signaled while stored in the APS.

As another example, when a FIR filter is used as the resampling in-loop filter and a frame is reconstructed with ALF, the video decoding device may utilize one of a plurality of FIR filters based on a scale value. The corresponding set of filter coefficients may be stored in the APS and signaled by the video encoding device.

The video decoding device stores the output frame generated by the resampling in-loop filter and filters in the DPB as a reference frame (S1910).

On the other hand, if the flag indicating whether the resampling in-loop filter is enabled or disabled is false (No in S1904), the video decoding device performs conventional in-loop filtering, where the resampling in-loop filter is excluded (S1920).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

The invention claimed is:

1. A method performed by a video decoding device for upsampling a reconstructed frame, the method comprising:
    obtaining the reconstructed frame, wherein the reconstructed frame is a frame from an original frame;
    setting a scale value representing a resolution difference between the reconstructed frame and the original frame, wherein the scale value is selected from the group including 1, 1.5, and 2;
    determining, based on the scale value, a resampling filter that is pre-trained by a neural network based on the scale value;
    generating an upsampled reconstructed frame by applying the resampling filter to the reconstructed frame; and
    storing the upsampled, reconstructed frame as a reference frame in a decoded picture buffer (DPB).

2. The method of claim 1, further comprising:
    decoding, from a bitstream, a resampling-filter-enabled flag indicating whether the resampling filter is enabled; and
    setting the scale value in response to the resampling-filter-enabled flag indicating that the resampling filter is enabled.

3. The method of claim 2, wherein setting the scale value includes:
    decoding, from the bitstream, a resampling-filter index indicating a scale value in response to the resampling-filter-enabled flag indicating that the resampling filter is enabled, and setting the scale value based on the index.

4. The method of claim 1, wherein the resampling filter includes an upsampling process using a transposed convolution operation that is an inverse of a convolution operation that extracts a feature map.

5. The method of claim 1, further comprising: when the resampling filter is interposed between the SAO filter and the adaptive loop filter, inputting the upsampled reconstructed frame into the adaptive loop filter; and storing an output frame generated by the adaptive loop filter as the reference frame in the decoded picture buffer.

6. The method of claim 1, further comprising: when the resampling filter is applied to a current frame, scaling the reference frame stored in the decoded picture buffer to fit the current frame in size before performing the inter prediction.

7. A method performed by a video encoding device for upsampling a reconstructed frame, the method comprising:
    obtaining the reconstructed frame, wherein the reconstructed frame is a frame reconstructed from the original frame;

setting a scale value representing a resolution difference between an original frame and the reconstructed frame, wherein the scale value is selected from a group including 1, 1.5, and 2;
    determining, based on the scale value, a resampling filter that is pre-trained by a neural network based on the scale value;
    generating an reconstructed frame by applying the resampling filter to the reconstructed frame; and
    storing the upsampled, reconstructed frame as a reference frame in a decoded picture buffer (DPB).

8. The method of claim 7, wherein setting the scale value includes:
    determining the scale value based on rate distortion optimization.

9. The method of claim 7, further comprising:
    downsampling the original frame by dividing horizontal and vertical dimensions of the original frame by the scale value with downsampled dimensions truncated or rounded to a nearest whole number.

10. The method of claim 7, further comprising:
    determining a resampling-filter-enabled flag indicating whether a resampling filter is enabled; and
    encoding the resampling-filter-enabled flag.

11. The video encoding method of claim 7, further comprising:
    determining a resampling-filter index indicating the scale value; and
    encoding the resampling-filter index.

12. A bitstream transmitting method to transmit a bitstream comprising:
    generating the bitstream by encoding an image based on a video encoding method; and
    transmitting the bitstream;
    wherein the video encoding method comprises:
    obtaining a reconstructed frame, wherein the reconstructed frame is a frame reconstructed from the original frame;
    setting a scale value representing a resolution difference between an original frame and the reconstructed frame, wherein the scale value is selected from a group including 1, 1.5, and 2;
    determining, based on the scale value, a resampling filter that is pre-trained by a neural network based on the scale value;
    generating an upsampled reconstructed frame by applying the resampling filter to the reconstructed frame; and
    storing the upsampled, reconstructed frame as a reference frame in a decoded picture buffer (DPB).

* * * * *